(12) United States Patent
Dano (10) Patent No.: US 7,555,933 B2
(45) Date of Patent: Jul. 7, 2009

(54) METHOD AND SOFTWARE FOR DETECTING VACUUM CONCENTRATOR ENDS-OF-RUNS

(75) Inventor: Etienne Dano, Brighton, MA (US)

(73) Assignee: Thermo Fisher Scientific Inc., Waltham, MA (US)

( * ) Notice: Subject to any disclaimer, the term of this patent is extended or adjusted under 35 U.S.C. 154(b) by 225 days.

(21) Appl. No.: 11/496,478

(22) Filed: Aug. 1, 2006

(65) Prior Publication Data

US 2008/0028833 A1 Feb. 7, 2008

(51) Int. Cl.
*G01M 19/00* (2006.01)
*B04B 13/00* (2006.01)
*B04B 15/00* (2006.01)
*B01D 1/30* (2006.01)

(52) U.S. Cl. ............... 73/37; 73/865.9; 494/7; 494/10

(58) Field of Classification Search ........... 62/228.5; 73/37, 865; 700/282; 494/4, 11; 202/205; 159/6.1, 47.1
See application file for complete search history.

(56) References Cited

U.S. PATENT DOCUMENTS

| | | | | |
|---|---|---|---|---|
| 3,011,333 A | * | 12/1961 | Roth et al. | .............. 73/865.3 |
| 3,938,354 A | | 2/1976 | Lehman | ............... 64/1 V |
| 3,977,944 A | | 8/1976 | Müller-Matthesius et al. | .... 195/103.5 R |
| 4,013,513 A | | 3/1977 | Lederer | ................ 195/66 R |
| 4,049,534 A | | 9/1977 | Posner | ................ 204/299 R |
| 4,200,611 A | | 4/1980 | Gorman, Jr. et al. | ........ 422/258 |
| 4,201,066 A | | 5/1980 | Nolan, Jr. | ................ 64/1 V |
| 4,226,669 A | | 10/1980 | Vilardi | ................ 159/6 R |
| 4,231,992 A | | 11/1980 | Gorman, Jr. et al. | ........ 422/258 |
| 4,431,506 A | | 2/1984 | Gorman, Jr. et al. | ..... 204/299 R |
| 4,435,168 A | | 3/1984 | Kennedy | .............. 494/20 |
| 4,492,759 A | | 1/1985 | Gorman et al. | ............. 436/72 |
| 4,626,176 A | | 12/1986 | Cole | ............... 417/54 |
| 4,784,824 A | | 11/1988 | Gandrille et al. | ........... 376/282 |
| 4,827,197 A | * | 5/1989 | Giebeler | ................. 318/3 |
| 4,964,961 A | | 10/1990 | Brautigam et al. | ....... 204/182.3 |
| 4,997,006 A | | 3/1991 | Zlobinsky et al. | ....... 137/625.21 |
| 5,003,787 A | | 4/1991 | Zlobinsky | ................ 62/185 |

(Continued)

FOREIGN PATENT DOCUMENTS

DE 4008945 9/1990

(Continued)

*Primary Examiner*—Thomas P Noland
(74) *Attorney, Agent, or Firm*—Wood, Herron & Evans, LLP (57) ABSTRACT

A method for determining ends of runs in a vacuum concentrator includes operating the vacuum concentrator at a pressure set point, periodically inducing a pressure increase in the vacuum concentrator, and determining an end-of-run state from a pressure vs. time relationship. In one embodiment of the present invention, the pressure increase is induced by opening the vacuum concentrator to atmosphere, and the end-of-run state is determined by measuring the time required for the vacuum concentrator to return to the pressure set-point. In another embodiment of the invention, the pressure increase is induced by isolating the vacuum concentrator for a defined period of time, and the end-of-run state is determined by measuring the pressure increase over that period of time. The end-of-run state may be determined by comparing the measured value to a threshold value or by comparing a measured rate of change to a threshold rate of change.

22 Claims, 7 Drawing Sheets

U.S. PATENT DOCUMENTS

| | | | | |
|---|---|---|---|---|
| 5,025,571 | A | 6/1991 | Zlobinsky et al. | 34/72 |
| 5,036,679 | A | 8/1991 | Zlobinsky et al. | 62/470 |
| 5,067,251 | A | 11/1991 | Zlobinsky et al. | 34/5 |
| 5,084,133 | A | 1/1992 | Guy et al. | 159/47.1 |
| 5,114,533 | A | 5/1992 | Guy et al. | 159/6.1 |
| 5,137,604 | A | 8/1992 | Meeks et al. | 202/205 |
| 5,211,808 | A | 5/1993 | Vilardi et al. | 159/6.1 |
| 5,217,572 | A | 6/1993 | Guy et al. | 159/6.1 |
| 5,242,370 | A * | 9/1993 | Silver et al. | 494/11 |
| 5,252,485 | A | 10/1993 | Zlobinsky et al. | 435/316 |
| D340,993 | S | 11/1993 | Bellotti | D24/224 |
| 5,263,268 | A | 11/1993 | Meeks et al. | 34/92 |
| 5,280,975 | A | 1/1994 | Tscheu et al. | 292/251 |
| 5,306,896 | A | 4/1994 | Glater et al. | 219/521 |
| D347,478 | S | 5/1994 | Pinkney | D24/216 |
| 5,334,130 | A | 8/1994 | Glater et al. | 494/4 |
| 5,496,254 | A | 3/1996 | Keller et al. | 494/7 |
| 5,509,881 | A * | 4/1996 | Sharples | 494/7 |
| 5,525,202 | A | 6/1996 | Evans et al. | 204/606 |
| 5,567,050 | A | 10/1996 | Zlobinsky et al. | 366/209 |
| 5,620,561 | A | 4/1997 | Kuhn et al. | 159/47.1 |
| 5,643,767 | A | 7/1997 | Fischetti et al. | 435/91.3 |
| 5,783,063 | A | 7/1998 | Clarkson et al. | 205/775 |
| D406,268 | S | 3/1999 | Lamond et al. | D15/7 |
| 5,885,433 | A | 3/1999 | Zilman et al. | 204/618 |
| D415,840 | S | 10/1999 | Lamond et al. | D24/219 |
| 5,971,908 | A | 10/1999 | Scheuber et al. | 494/84 |
| 6,047,557 | A * | 4/2000 | Pham et al. | 62/228.5 |
| 6,286,321 | B1 | 9/2001 | Glater | 62/55.5 |
| 6,372,486 | B1 | 4/2002 | Fripp | 435/303.1 |
| 6,461,287 | B1 | 10/2002 | Glater | 494/16 |
| 6,521,464 | B1 | 2/2003 | Cole | 436/176 |
| 6,605,474 | B1 | 8/2003 | Cole | 436/177 |
| 6,635,007 | B2 | 10/2003 | Evans, III et al. | 494/7 |
| 6,682,631 | B2 | 1/2004 | Cole | 159/6.1 |
| 6,722,214 | B1 * | 4/2004 | Cole | 73/865 |
| 6,803,594 | B2 | 10/2004 | Spolaczyk et al. | 250/574 |
| 6,866,621 | B1 | 3/2005 | Müller et al. | 494/7 |
| 6,991,704 | B2 | 1/2006 | Broadbent | 159/6.1 |
| 2002/0092802 | A1 | 7/2002 | Evana, III et al. | 210/143 |
| 2004/0122559 | A1* | 6/2004 | Young et al. | 700/269 |
| 2004/0164032 | A1* | 8/2004 | Felt et al. | 210/787 |
| 2004/0260514 | A1* | 12/2004 | Beaudoin et al. | 702/182 |

FOREIGN PATENT DOCUMENTS

| | | |
|---|---|---|
| DE | 4109470 | 10/1991 |
| DE | 4113174 | 1/1992 |
| EP | 1135211 | 1/2003 |
| FR | 2661484 | 10/1991 |
| FR | 2664367 | 1/1992 |
| GB | 2243414 | 10/1991 |
| GB | 2246192 | 1/1992 |
| WO | WO 00/20633 | 4/2000 |
| WO | WO 00/32312 | 6/2000 |
| WO | WO 03/000419 | 1/2003 |

* cited by examiner

FIG. 1

PRIOR ART

FIG. 2

PRIOR ART

PRIOR ART

FIG. 4

PRIOR ART

METHOD AND SOFTWARE FOR DETECTING VACUUM CONCENTRATOR ENDS-OF-RUNS

FIELD OF THE INVENTION

The present invention relates generally to vacuum concentrators. More particularly, the present invention relates to a method for accurately detecting when all solvents have been evaporated from specimens being processed in a vacuum concentrator.

BACKGROUND OF THE INVENTION

Samples of biological or pharmaceutical materials to be recovered, for example during drug discovery experiments, are often contained in a liquid or solvent vehicle. In order to recover the sample, it is necessary to dry the specimen. Thus, it is known to place the specimen in a vessel, such as a test tube, and to utilize a device known as a vacuum concentrator to dry and recover the sample. Vacuum concentrators subject the specimens to centrifugal forces in order to apply the specimen against the end of its container. The evaporation process is accelerated by creating a partial vacuum in the chamber, thereby lowering the boiling point of the liquid or solvent vehicle. In addition, the specimens may be heated to further facilitate the drying process. The centrifugal forces inhibit splashing in the event the specimens boil.

Extant vacuum concentrators often simply execute a predetermined program. That is, the specimens are centrifuged and heated under partial vacuum for a particular amount of time intended to be sufficient to complete the drying process. Since these programs do not take into account the actual amount of solvent remaining in the specimens, they may result in shorter- or longer-than-necessary vacuum concentrator runs. Thus, the result may be insufficient drying, in the event of a program run shorter than required, or inefficiency, in the event of a program run longer than actually required.

Accordingly, it is desirable to provide a method of accurately determining the end of a run in a vacuum concentrator. That is, it is desirable to provide a method for accurately determining when all solvents have been evaporated from the specimens being dried in a vacuum concentrator.

SUMMARY OF THE INVENTION

The foregoing needs are met, to a great extent, by the present invention, wherein a method is provided that in some embodiments determines the end of a vacuum concentrator run through a pressure vs. time relationship. In this way, the operation of the vacuum concentrator can cease when all solvents have been evaporated rather than when a pre-programmed time has elapsed.

In accordance with one embodiment of the present invention, a method of detecting an end of a run in a vacuum concentrator includes the steps of operating the vacuum concentrator at a pressure set point, inducing a pressure increase in the vacuum concentrator, measuring the pull-down time required for the vacuum concentrator to return to the pressure set point, and determining an end-of-run state from the measured pull-down time. The end-of-run state may be determined by comparing the measured pull-down time to a pull-down time threshold or by comparing the rate of change in the measured pull-down time to a pull-down time rate of change threshold. In either instance, operation of the vacuum concentrator can cease when the measured value is less than or equal to the threshold value.

In accordance with another embodiment of the present invention, a method of detecting an end of a run in a vacuum concentrator includes the steps of operating the vacuum concentrator at a pressure set point, inducing a pressure increase in the vacuum concentrator by isolating the vacuum concentrator for a defined period of time, measuring the pressure increase during that period of time, and determining an end-of-run state from the measured pressure increase. The end-of-run state may be determined by comparing the measured pressure increase to a pressure increase threshold or by comparing the rate of change in the measured pressure increase to a pressure increase rate of change threshold. In either instance, operation of the vacuum concentrator can cease when the measured value is less than or equal to the threshold value.

In accordance with yet another aspect of the present invention, a software program for detecting an end of a run in a vacuum concentrator is provided. The vacuum concentrator operates at a pressure set point. The software includes a pressure sensing module, a module for periodically inducing a pressure increase in the vacuum concentrator, a timing module, and a detection module. The pressure sensing module is in communication with and receives input from a pressure sensor installed in the vacuum concentrator. The detection module is in communication with, and detects the end of the run via an output from, at least one of the pressure sensing module and the timing module.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a method of determining the point in a vacuum concentrator run at which all solvents have been evaporated. The method involves examining relationships between pressure within the vacuum concentrator and operating time. Thus, a vacuum concentrator incorporating the end-of-run detection method or software according to the present invention will more accurately terminate the vacuum concentrator run relative to evaporation of all solvents, thereby facilitating complete and efficient drying of the specimens.

FIGS. 1 through 5 illustrate an exemplary vacuum concentrator. The vacuum concentrator includes a casing 1 having a base 2, feet 3, a front edge 4, a rear edge 5, two lateral sides 6, and an upper side 7 defining a large circular opening from which a cylindrical vessel 8 depends. Vessel 8 has therein a rotor 9. The upper edge of vessel 8 (that is, the edge nearest upper side 7) is surrounded by a sealing element 10, against which a cover 11 engages to create a hermetic seal.

Cover 11 is guided and maintained in position by two horizontal lateral rails 12. In addition, cover 11 includes front projections 13 and rear projections 14, which constitute axes of rotation for rollers running in openings 15 in rails 12. Cover 11 can be horizontally translated in rails 12 between a closed position (illustrated in FIG. 1) and an open position wherein the rear projections 14 abut the ends of rails 12. When cover 11 reaches this position, projections 13 may escape through gaps in the upper edge of rails 12, such that cover 11 is pivotable about an axis of rotation defined by projections 14. The segment of cover 11 rearward of projections 14 is thus capable of pivotable movement into a recess 16 in rear side 5 of casing 1.

Figure 1:
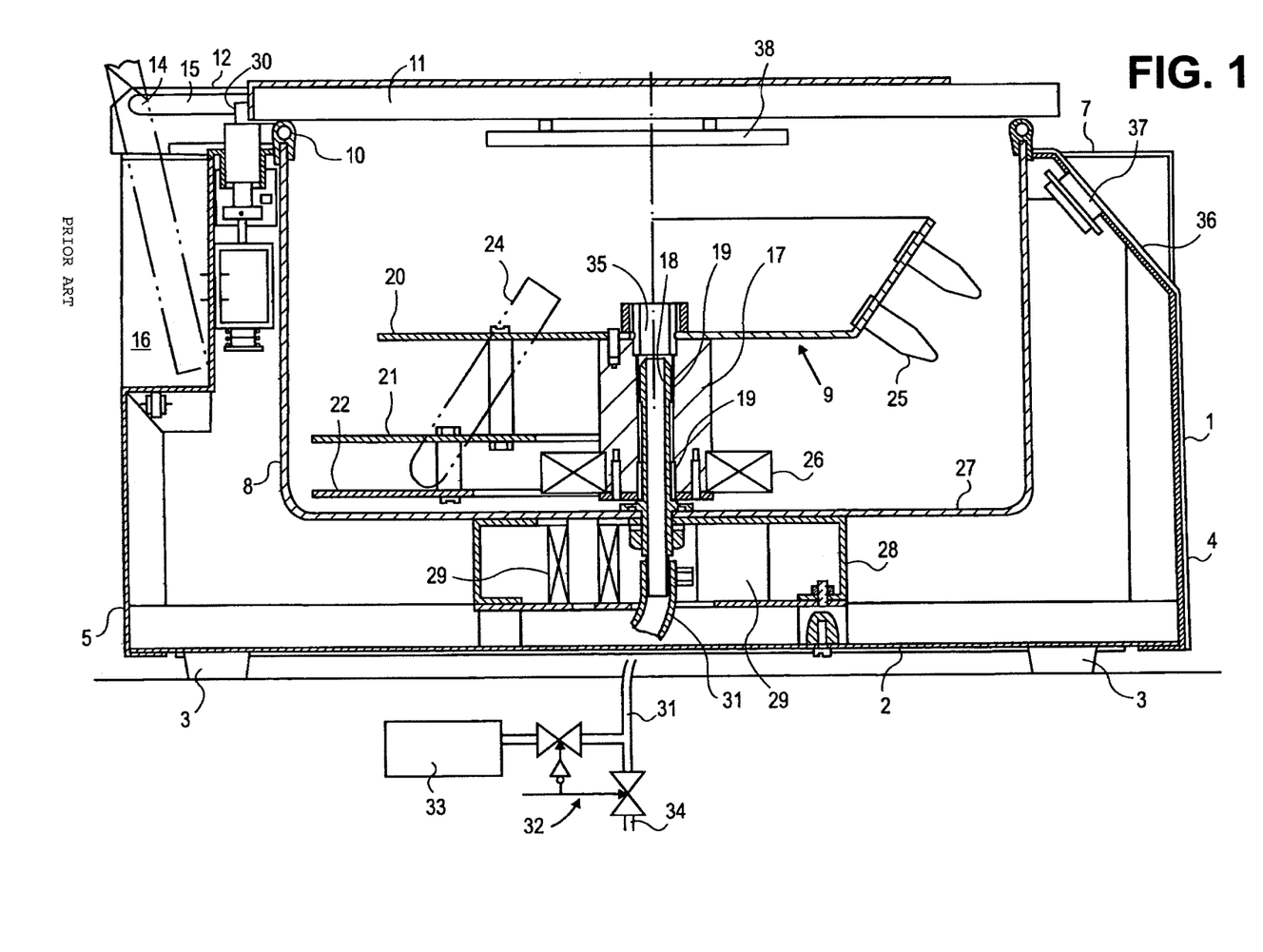
FIG. 1 is a sectional view of a vacuum concentrator.
Figure 2:
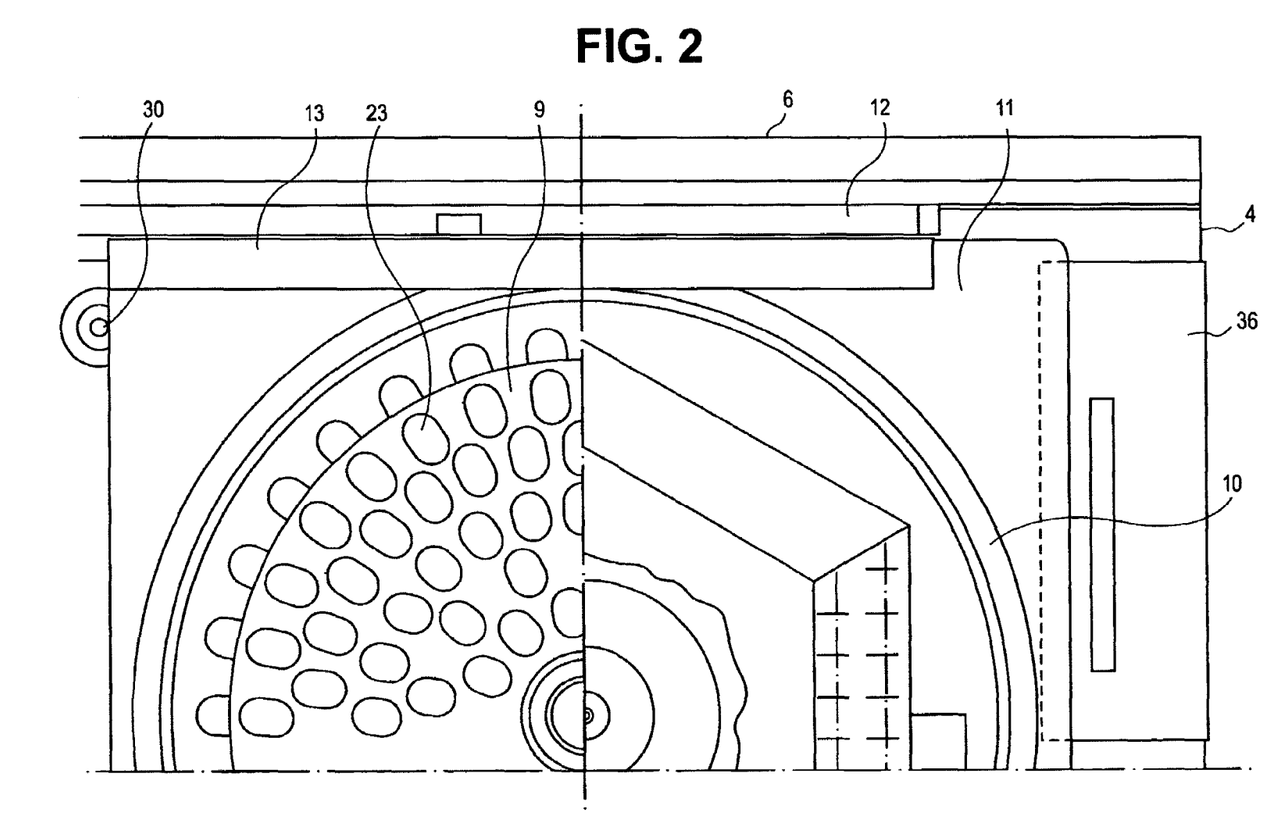
FIG. 2 is a top view of a vacuum concentrator.
Figure 3:
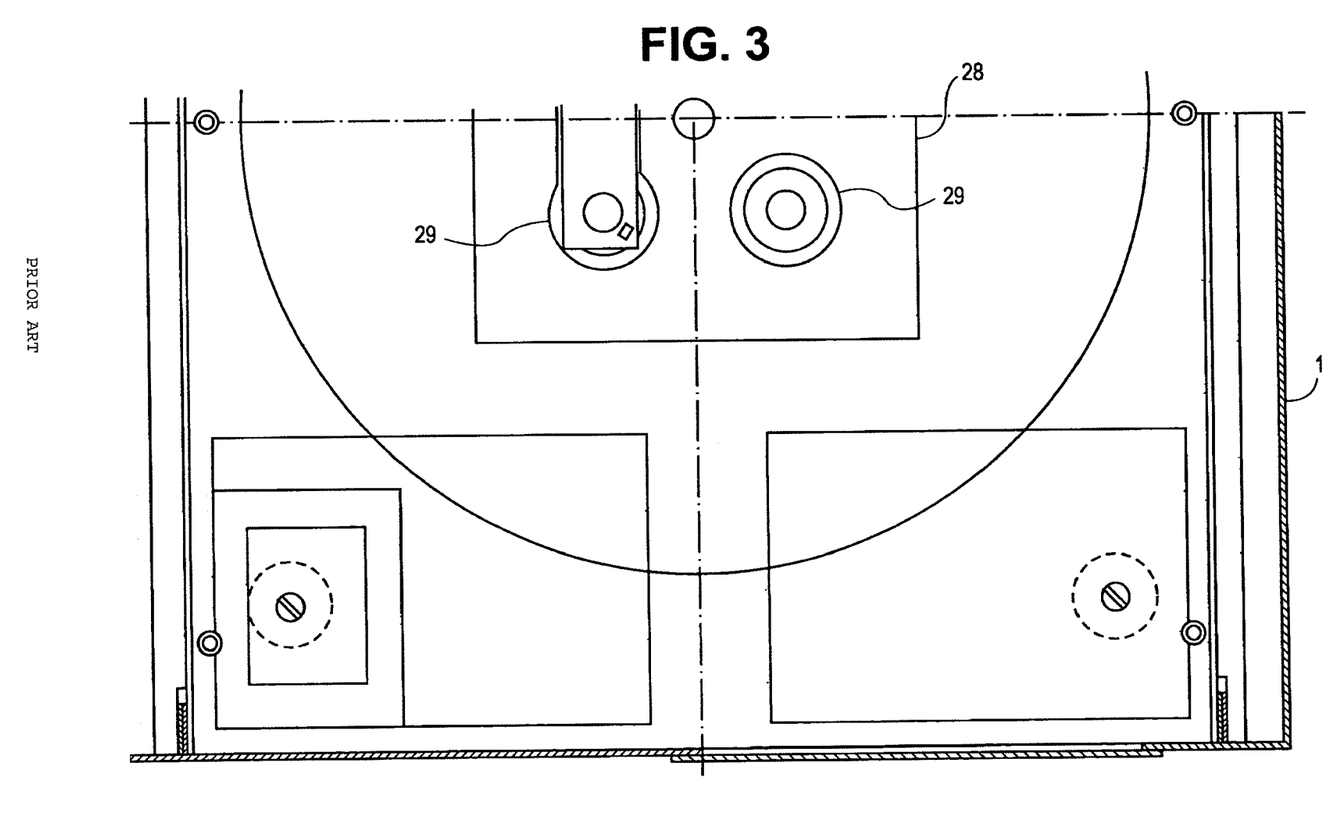
FIG. 3 is a horizontal sectional view of a vacuum concentrator just below the base of the vessel.
Figure 4:
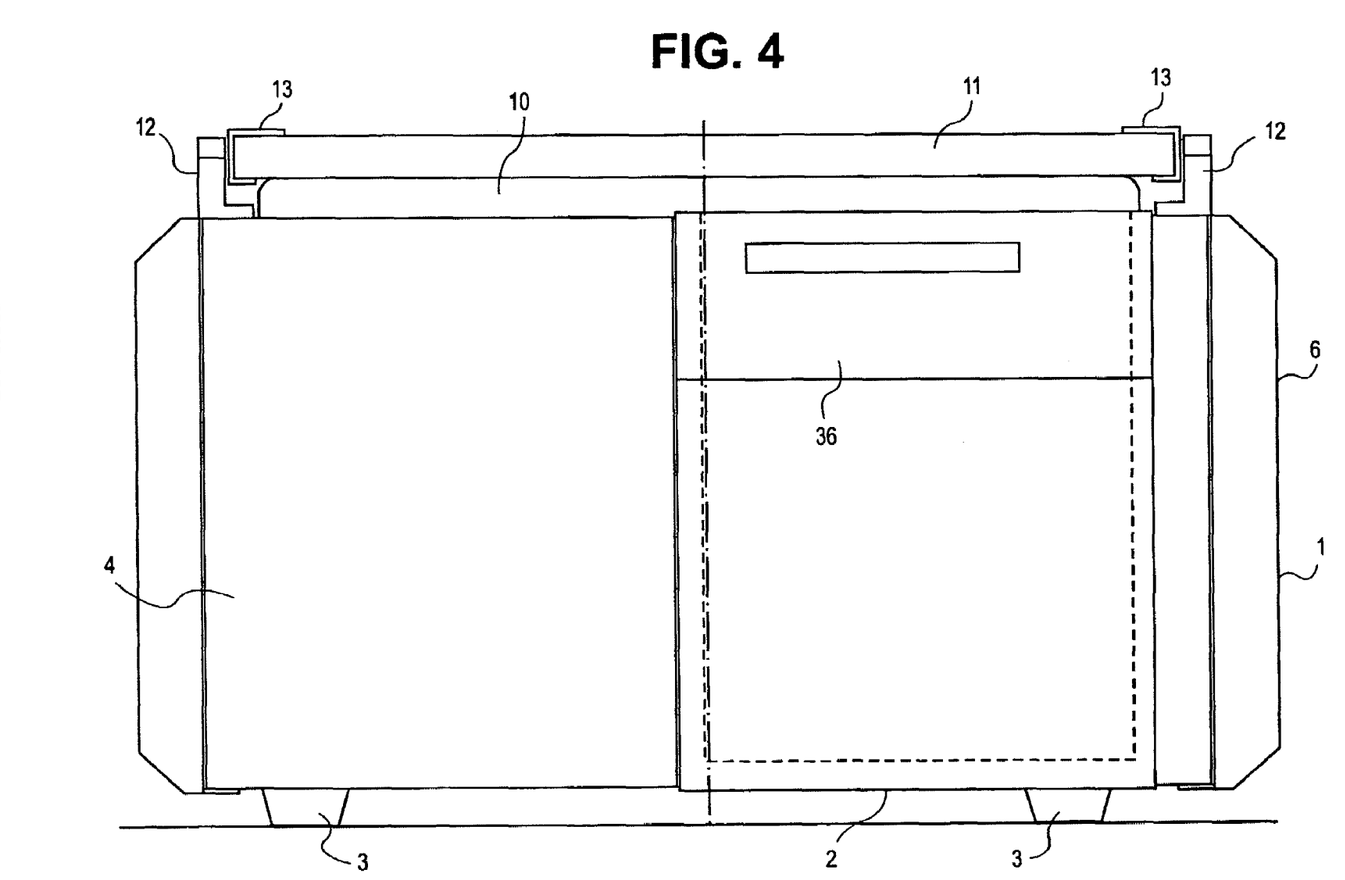
FIG. 4 is a front view of a vacuum concentrator.
Figure 5:
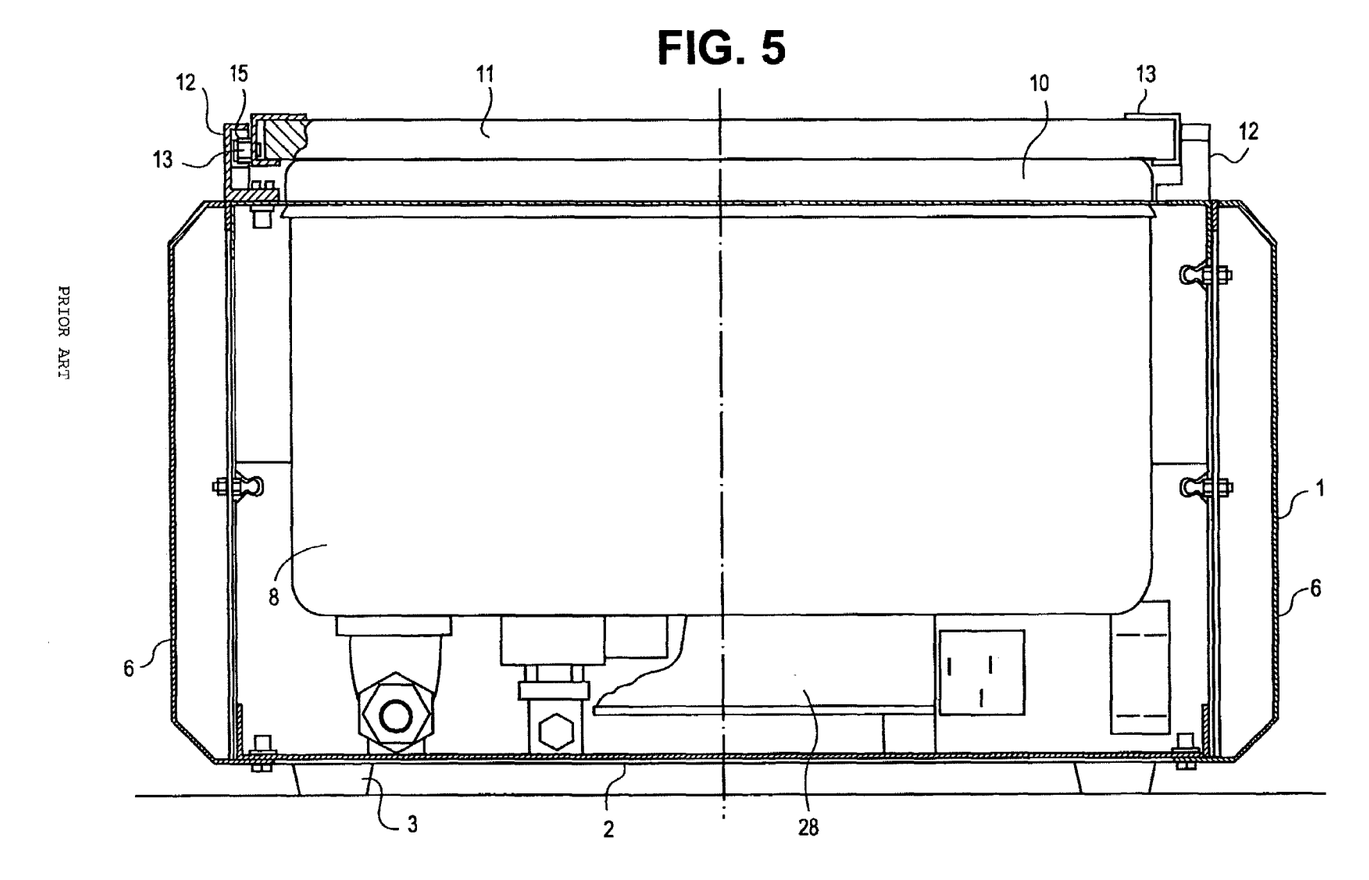
FIG. 5 is a front view of a vacuum concentrator with the front part of the casing removed.

Rotor 9 includes a hub 17, which is pivotal about a vertical tubular pivot 18 with interposition of self-lubricating bushes 19. The lower bush 19 is mounted on a horizontal circular fixed bearing surface so as to maintain the rotor in a vertical position. Hub 17 of rotor 9 carries a number of plates 20, 21, 22, as shown in FIG. 2, having oblong openings 23 for receiving in an inclined position specimen carrying test-tubes 24, 25.

In its lower part, hub 17 carries an annular element 26 having an alternation of north poles and south poles oriented toward the bottom 27 of vessel 8, which is disposed in proximity thereto. Annular element 26 may have three north poles and three south poles, though other configurations of annular element 26 are contemplated.

Housed under bottom 27 of vessel 8 is an electromagnetic driving unit 28 having four fixed coils 29 for receiving current from an electric network through a distributor having a transistorized commutation. This permits the selective and successive control of the four coils 29 in the desired direction of rotation of the field. Two Hall-effect sensors (not shown) are also disposed in this region so as to be responsive to the poles of the magnetized element 26, and consequently to the angular position of rotor 9 and, in certain embodiments, also to its speed. The sensors control the commutation means so as to ensure the commutation in the direction of circulation of the current in each coil 29 and thereby produce alternately an attraction or a repulsion of the magnetic pole located in the field of action of the coil 29 concerned. This results in a rotation of rotor 9 at the required speed, for example on the order of about 1500 rpm.

In order to ensure locking of cover 11, a slidable pin 30 driven by a suitable magnetic coil is placed behind the rear edge of cover 11 when cover 11 is in the closed position and the vacuum concentrator is started up. In this way, pin 30 locks cover 11 in position so that it cannot move rearward. Cover 11 is restrained in the forward direction by a suitable abutment of cover 11 against the front end of rails 12. As described below, a sensor may permit checking the correct closure of cover 11 before allowing rotation of rotor 9.

For safety reasons, when the vacuum concentrator is stationary, the supply of current to the coil maintaining pin 30 in its upper, blocking position is subordinate to the detection of the speed of rotation of rotor 9. It is thus possible to detect this speed, for example by means of Hall-effect sensors, such that pin 30 remains in its locking position so long as the speed of rotor 9 is not substantially zero.

Tubular pivot 18 extends through bottom 27 of vessel 8 in a sealed manner owing to the provision of an O-ring, and further extends through the inside of the unit 28, where it is connected to a flexible tube 31 leading to a three-way electrically operated valve system 32. Valve system 32 leads, through one of the ways, to the vacuum pump 33, with optional interposition of additional elements, such as solvent traps and acid traps, and through another way 34 to atmosphere. When way 34 is open, it enables the interior of vessel 8 to be put at atmospheric pressure by means of the orifice or nozzle 35 through which tubular pivot 18 opens into vessel 8. If way 34 is closed and the way leading to vacuum pump 33 is open, vacuum pump 33 establishes in the enclosure formed by vessel 8 the required partial vacuum. That is, vacuum pump 33 achieves the operating pressure set point within vessel 8, in some embodiments about 1 hpa. Activation and deactivation of vacuum pump 33 may, in certain embodiments, be related to the speed of rotor 9 such that vacuum pump 33 activates above a certain activation speed of rotor 9, such as about 600 rpm, and deactivates below a certain deactivation speed of rotor 9, such as about 500 rpm.

The vacuum concentrator may be controlled through a control panel 36 connected to a microprocessor 37 programmed to perform various functions of the vacuum concentrator. Microprocessor 37 manages functions including, but not limited to, the general electric supply of the vacuum concentrator, sensing the position of cover 11 (i.e., to ensure that rotor 9 does not start rotating with cover 11 in the open position), positioning locking pin 30 (i.e., to ensure that cover 11 is securely locked in the closed position prior to engaging rotor 9), supplying current to coils 29 (i.e., to actuate rotor 9), detecting the speed of rotor 9, heating the vacuum concentrator, activating and deactivating vacuum pump 33, actuation of valves in valve system 32, and end-of-run detection.

A heating resistor 38 is carried by the lower side of cover 11 and is suitably supplied with power from the exterior of cover 11 through conductors extending therethrough.

Once specimen-carrying test tubes 24, 25 have been loaded in rotor 9, cover 11 is closed and the vacuum concentrator run begins. Pin 30 is urged upwardly and locks cover 11 in the closed position. Coils 29 are supplied with current, and rotor 9 begins to rotate with increasing speed. When the speed of rotor 9 exceeds the activation speed (i.e., about 600 rpm), vacuum pump 33 is activated by microprocessor 37. A valve closes opening to atmosphere 34 and opens the way leading to vacuum pump 33, which establishes partial vacuum (i.e., a pressure set point of about 1 hpa) within vessel 8. Rotor 9 eventually reaches its normal operating speed, in some embodiments of the invention about 1500 rpm, where it remains during the run. During operation of the vacuum concentrator, current is supplied to resistor 38 in order to heat and evaporate solvents within test tubes 24, 25.

It will be understood from this disclosure and from practicing the invention that, when establishing vacuum within vessel 8, the air initially contained within vessel 8 is drawn off through orifice 35. It should be further understood that solvent vapors are also drawn off through orifice 35.

Figure 6:
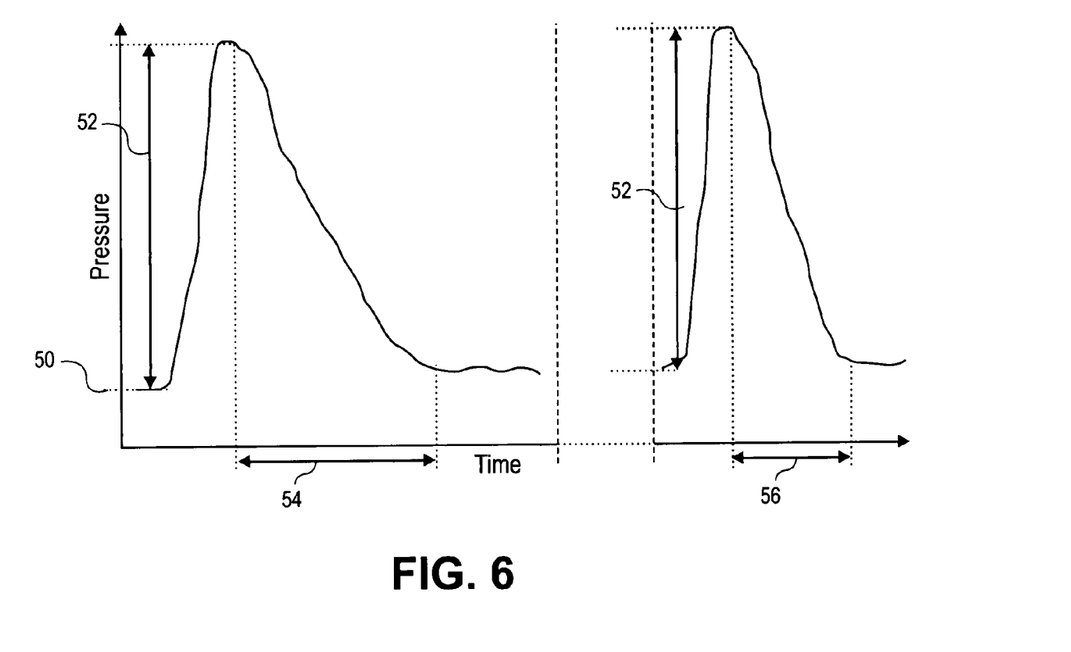
FIG. 6 is a graph of pressure vs. time for an end-of-run detection method according to one embodiment of the present invention.

Turning now to FIG. 6, there is shown a graph of an end-of-run detection method according to one embodiment of the present invention. The graph of FIG. 6 plots pressure within vessel 8 as a function of vacuum concentrator operating time. As described above, the vacuum concentrator operates with vessel 8 at a partial vacuum pressure set point 50. Periodically, a pressure increase $\Delta P$ 52 is induced in vessel 8. This may be accomplished, for example, by opening way 34 to atmosphere and closing the way to vacuum pump 33 for a short instant and then re-sealing the vacuum concentrator to reestablish partial vacuum (i.e., closing way 34 and opening the way to vacuum pump 33). Such a "sweeping" process is described in U.S. Pat. No. 5,217,572 to Guy et al., the disclosure of which is herein expressly incorporated by reference in its entirety. Once the vacuum concentrator is resealed, vacuum pump 33 re-establishes partial vacuum. The time required for vessel 8 to return to pressure set point 50, herein referred to as the pull-down time or $\Delta T$, is measured.

At any point in time during operation of the vacuum concentrator, the pull-down time is a function of the natural leaks of both the vacuum concentrator and the amount of solvent being evaporated in vessel 8. Early in the run, more solvents remain, and thus a greater pull-down time $\Delta T'$ 54 is observed. As solvents evaporate from test tubes 24, 25, however, shorter pull-down times are observed for the same pressure increase 52, until such time as the pull-down time $\Delta T''$ 56 is attributable only to natural leaks. This point is the end-of-run state—that is, the point at which all solvents have been evaporated—and can be determined from the measured pull-down time $\Delta T$.

In some embodiments of the invention, the end of the run is determined by comparing the measured pull-down time $\Delta T$ to a pull-down time threshold. When the measured pull-down time $\Delta T$ is less than or equal to the pull-down time threshold, the vacuum concentrator has reached the end of its run (i.e., all solvents have been evaporated), and operation can cease.

The pull-down time threshold may be established through a calibration process designed to identify and isolate the pull-down time attributable only to the natural leaks of the vacuum concentrator. To this end, the vacuum concentrator may be operated with vessel 8 at pressure set point 50 while vessel 8 is substantially empty. Pressure increase 52 is then induced as described above and a baseline pull-down time measured. Since vessel 8 is substantially empty, the baseline pull-down time reflects only the natural leaks within vacuum concentrator 7. That is, the baseline pull-down time represents the pull-down time required when no solvents are evaporating within vessel 8. Accordingly, the pull-down time threshold may be set equal to the baseline pull-down time. However, other methods of establishing the pull-down time threshold are regarded as within the spirit and scope of the present invention.

Alternatively, the end-of-run state may be determined by comparing a rate of change in the measured pull-down time $\Delta T$ to a pull-down time rate of change threshold. As should be understood from this disclosure and from practicing the invention, as the vacuum concentrator nears the end of the run, the rate of change in the measured pull-down time $\Delta T$ decreases towards a limit of zero. When the measured pull-down time $\Delta T$ no longer changes, one can conclude that all solvents have been evaporated from vessel 8. It is also contemplated that one may make such a conclusion at a non-zero value of the rate of change of the measured pull-down time. Thus, operation of the vacuum concentrator may cease when the rate of change in the measured pull-down time is less than or equal to the pull-down time rate of change threshold.

Figure 7:
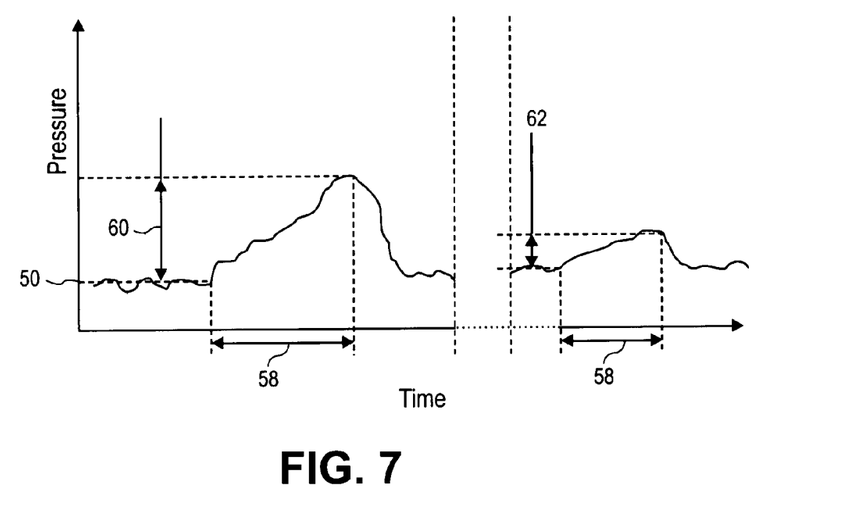
FIG. 7 is a graph of pressure vs. time for an end-of-run detection method according to another embodiment of the present invention.

Referring now to FIG. 7, a graph of pressure within vessel 8 vs. time is shown for another embodiment of the end-of-run detection method of the present invention. As with the embodiment illustrated in FIG. 6, the vacuum concentrator operates at a pressure set point 50 within vessel 8. A pressure increase $\Delta P$ is induced in vessel 8 by isolating vessel 8 for a defined period of time $\Delta T$ 58. Vessel 8 may be isolated, for example, by closing the release and vacuum valves (i.e., way 34 to atmosphere and the way to vacuum pump 33). The pressure increase $\Delta P$ over period of time 58 is then measured.

Figure 8:
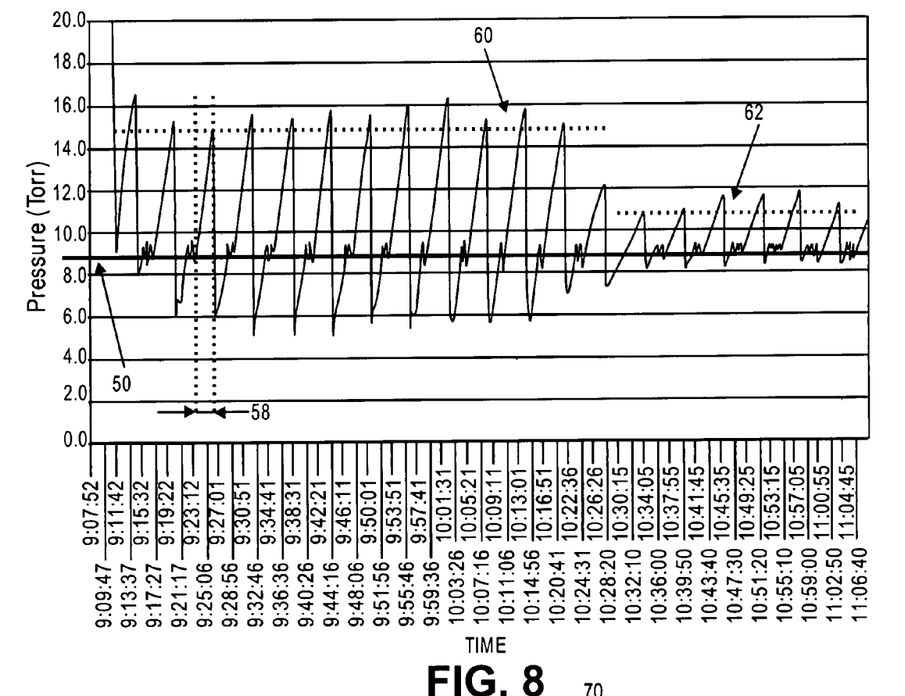
FIG. 8 is a graph of pressure vs. time for an end-of-run detection process conducted according to the method illustrated in FIG. 7.

As one skilled in the art will understand from this disclosure and from practicing the invention, $\Delta P$ is a function of both the volume of solvents evaporated over period of time 58 and the natural leaks of the vacuum concentrator. Early in the run, more solvents remain, and thus a greater pressure increase $\Delta P'$ 60 is observed. As solvents evaporate from test tubes 24, 25, however, smaller pressure increases $\Delta P$ are observed for the same $\Delta T$ 58. Eventually, pressure increase $\Delta P''$ 62 is attributable only to natural leaks. This point is the end-of-run state and can be determined from the measured pressure increase $\Delta P$. FIG. 8 illustrates this process.

In some embodiments of the invention, the end-of-run state is determined by comparing the measured pressure increase $\Delta P$ to a pressure increase threshold. When the measured pressure increase is less than or equal to the pressure increase threshold, the vacuum concentrator has reached the end of its run (i.e., all solvents have been evaporated, and pressure increase is due only to natural leaks), and operation can cease.

The pressure increase threshold may be established through a calibration process designed to identify and isolate the pressure increase attributable only to the natural leaks of the vacuum concentrator. To this end, the vacuum concentrator may be operated with vessel 8 at pressure set point 50 while vessel 8 is substantially empty. A pressure increase $\Delta P$ is then induced as described above (i.e., by isolating vessel 8 for a period of time 58). A baseline pressure increase is then measured. Since vessel 8 is substantially empty, the baseline pressure increase reflects only the natural leaks within the vacuum concentrator. That is, the baseline pressure increase represents the pressure increase observed when no solvents are evaporated within vessel 8. Accordingly, the pressure increase threshold may be set equal to the baseline pressure increase. However, other methods of establishing the pressure increase threshold are regarded as within the spirit and scope of the present invention.

Alternatively, the end-of-run state may be determined by comparing a rate of change in the measured pressure increase $\Delta P$ to a pressure increase rate of change threshold. As should be understood from this disclosure and from practicing the invention, as the vacuum concentrator nears the end of the run, the rate of change in the measured pressure increase $\Delta P$ approaches zero. When the measured pressure increase no longer changes, one can conclude that all solvents have been evaporated from vessel 8. It is also contemplated that one may make such a conclusion at a non-zero value of the rate of change of the measured pressure increase. Thus, operation of the vacuum concentrator may cease when the rate of change in the measured pressure increase is less than or equal to the pressure increase rate of change threshold.

As mentioned above, microprocessor 37 includes a software program 70 for detecting the end of the vacuum concentrator run. Software program 70 is illustrated in block form in FIG. 9. Software program 70 includes a pressure sensing module 72, a module 74 for periodically inducing a pressure increase within vessel 8, a timing module 76, and a detection module 78.

Figure 9:
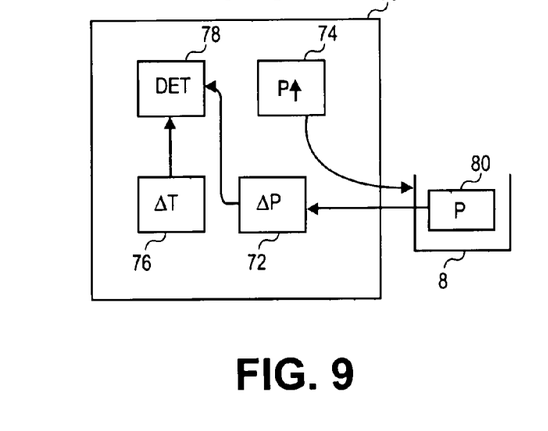
FIG. 9 is a block diagram of a software program for end-of-run detection.

Pressure sensing module 72 of detection program 70 communicates with and receives input from a pressure sensor 80 installed in the vacuum concentrator, and, in particular, in vessel 8. Thus, pressure sensing module 72 is capable of calculating $\Delta P$ within vessel 8. Similarly, timing module 76 is capable of calculating or monitoring $\Delta T$. Module 74 periodically induces a pressure increase within vessel 8, for example by opening the vessel 8 to atmosphere or by isolating vessel 8 for a defined time interval.

Detection module 78 is in communication with at least one of pressure sensing module 72 and timing module 76, and detects the end of the vacuum concentrator run by utilizing an output from at least one of pressure sensing module 72 and timing module 76. For example, as illustrated in FIG. 6, detection module 78 can detect the end of the vacuum concentrator run by comparing a pull-down time $\Delta T$ output by timing module 76 to a pull-down time threshold. Alternatively, detection module 78 can detect the end of the vacuum concentrator run by comparing a pressure increase $\Delta P$ output by pressure sensing module 72 to a pressure increase threshold.

Once the end of the vacuum concentrator run is detected, operation of the vacuum concentrator can cease. The supply of current to coils 29 is reversed so as to brake rotor 9, and the supply of current to resistor 38 is stopped. When the speed of rotor 9 passes through the deactivation speed (i.e., 500 rpm), vacuum pump 33 is shut down. Valve 32 opens way 34, and atmospheric air enters vessel 8 until pressure equalizes. Once the speed of rotor 9 becomes very low, locking pin 30 may be downwardly withdrawn to permit the opening of cover 11.

Although an example of the end-of-run detection method is described using the vacuum concentrator illustrated in FIGS. 1-5, it will be appreciated that the method may be practiced equally well in other vacuum concentrator configurations.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of detecting an end of a run in a vacuum concentrator, the method comprising:
   operating the vacuum concentrator at a pressure set point;
   inducing a pressure increase in the vacuum concentrator;
   measuring a pull-down time required for the vacuum concentrator to return to the pressure set point; and
   determining an end-of-run state from the measured pull-down time.

2. The method according to claim 1, wherein determining the end-of-run state from the measured pull-down time comprises comparing the measured pull-down time to a pull-down time threshold.

3. The method according to claim 2, wherein the pull-down time threshold is established via a calibration process, the calibration process comprising:
   operating the vacuum concentrator at the pressure set point while substantially empty;
   inducing the pressure increase in the vacuum concentrator;
   measuring a baseline pull-down time required for the substantially empty vacuum concentrator to return to the pressure set point; and
   setting the pull-down time threshold equal to the baseline pull-down time.

4. The method according to claim 2, further comprising ceasing operation of the vacuum concentrator when the measured pull-down time is less than or equal to the pull-down time threshold.

5. The method according to claim 1, wherein determining the end-of-run state from the measured pull-down time comprises comparing a rate of change in the measured pull-down time to a pull-down time rate of change threshold.

6. The method according to claim 5, further comprising ceasing operation of the vacuum concentrator when the rate of change in the measured pull-down time is less than or equal to the pull-down time rate of change threshold.

7. The method according to claim 1, wherein inducing the pressure increase in the vacuum concentrator comprises:
   opening the vacuum concentrator to atmosphere; and
   re-sealing the vacuum concentrator.

8. The method of claim 1, wherein the end of the vacuum concentrator run is determined according the detected pressure in vacuum concentrator and the pull-down time.

9. The method of claim 1 wherein detecting the end of the vacuum concentrator run is performed by comparing a pull down time output to a pull-down threshold and by comparing the pressure increase output to a pressure increase threshold, the end of run braking a rotor of the vacuum concentrator.

10. A method of detecting an end of a run in a vacuum concentrator, the method comprising:
    operating the vacuum concentrator at a pressure set point;
    inducing a pressure increase in the vacuum concentrator by isolating the vacuum concentrator for a defined period of time;
    measuring the pressure increase during the defined period of time; and
    determining an end-of-run state from the measured pressure increase.

11. The method according to claim 10, wherein determining the end-of-run state from the measured pressure increase comprises comparing the measured pressure increase to a pressure increase threshold.

12. The method according to claim 11, wherein the pressure increase threshold is established via a calibration process, the calibration process comprising:
    operating the vacuum concentrator at the pressure set point while substantially empty;
    inducing the pressure increase in the vacuum concentrator by isolating the vacuum concentrator for the defined period of time;
    measuring a baseline pressure increase during the defined period of time; and
    setting the pressure increase threshold equal to the baseline pressure increase.

13. The method according to claim 11, further comprising ceasing operation of the vacuum concentrator when the measured pressure increase is less than or equal to the pressure increase threshold.

14. The method according to claim 10, wherein determining the end-of-run state from the measured pressure increase comprises comparing a rate of change in the measured pressure increase to a pressure increase rate of change threshold.

15. The method according to claim 14, further comprising ceasing operation of the vacuum concentrator when the rate of change in the measured pressure increase is less than or equal to the pressure increase rate of change threshold.

16. A software program resident in, and configured to be executed by, a microprocessor for detecting an end of a run in a vacuum concentrator operating at a pressure set point, said program comprising:
- a pressure sensing module in communication with and receiving input from a pressure sensor installed in the vacuum concentrator;
- a module for periodically inducing a pressure increase in the vacuum concentrator;
- a timing module; and
- a detection module in communication with at least one of said pressure sensing module and said timing module, wherein said detection module detects the end of the run via an output from at least one of said pressure sensing module and said timing module.

17. The software program according to claim 16, wherein said module for periodically inducing the pressure increase in the vacuum concentrator periodically opens the vacuum concentrator to atmosphere.

18. The software program according to claim 17, wherein said timing module outputs to said detection module a pull-down time required for the vacuum concentrator to return to the pressure set point.

19. The software program according to claim 18, wherein said detection module detects the end of the run by comparing the pull-down time output by said timing module to a pull-down time threshold.

20. The software program according to claim 16, wherein said module for periodically inducing the pressure increase in the vacuum concentrator periodically isolates the vacuum chamber for a defined time interval.

21. The software program according to claim 20, wherein said pressure sensing module outputs to said detection module the pressure increase in the vacuum chamber during the defined time interval.

22. The software program according to claim 21, wherein said detection module detects the end of the run by comparing the pressure increase output by said pressure sensing module to a pressure increase threshold.

* * * * *

UNITED STATES PATENT AND TRADEMARK OFFICE
CERTIFICATE OF CORRECTION

PATENT NO. : 7,555,933 B2 Page 1 of 1
APPLICATION NO. : 11/496478
DATED : July 7, 2009
INVENTOR(S) : Etienne Dano It is certified that error appears in the above-identified patent and that said Letters Patent is hereby corrected as shown below:

In claim 8, column 8, lines 33-34, change "according the detected pressure in vacuum concentrator" to --according to the detected pressure in the vacuum concentrator--.

Signed and Sealed this

Sixteenth Day of February, 2010

David J. Kappos
*Director of the United States Patent and Trademark Office*